United States Patent
Saito et al.

(10) Patent No.: US 12,528,402 B2
(45) Date of Patent: Jan. 20, 2026

(54) CONTROLLER FOR LIGHTING CONTROL, VEHICLE LAMP SYSTEM

(71) Applicant: Stanley Electric Co., Ltd., Tokyo (JP)

(72) Inventors: Kenichi Saito, Tokyo (JP); Kazuhiko Ueno, Tokyo (JP); Sumihisa Furufuji, Tokyo (JP); Dianqi Song, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 174 days.

(21) Appl. No.: 18/244,922

(22) Filed: Sep. 12, 2023

(65) Prior Publication Data

US 2024/0092251 A1    Mar. 21, 2024

(30) Foreign Application Priority Data

Sep. 15, 2022  (JP) .................................. 2022-147023

(51) Int. Cl.
  *B60Q 1/18* (2006.01)
  *H04N 23/74* (2023.01)

(52) U.S. Cl.
  CPC .............. *B60Q 1/18* (2013.01); *H04N 23/74* (2023.01); *B60Q 2300/05* (2013.01)

(58) Field of Classification Search
  CPC ....... B60Q 1/18; B60Q 2300/05; H04N 23/74
  See application file for complete search history.

(56) References Cited

U.S. PATENT DOCUMENTS

| 2013/0113935 A1* | 5/2013 | Naik .................... B60Q 1/085 348/148 |
| 2016/0332568 A1* | 11/2016 | Kim ..................... B60Q 1/544 |
| 2019/0095726 A1 | 3/2019 | Kawamata et al. |
| 2019/0364199 A1* | 11/2019 | Koravadi ............... H04N 23/60 |

(Continued)

FOREIGN PATENT DOCUMENTS

| DE | 20 2012 004671 U1 | 7/2013 |
| DE | 10 2015 212365 A1 | 1/2017 |
| DE | 10 2020 202329 A1 | 8/2021 |

(Continued)

OTHER PUBLICATIONS

Machine translation of JP-2019217951-A (Year: 2019).*

(Continued)

*Primary Examiner* — Kenneth M Dunne
(74) *Attorney, Agent, or Firm* — XSENSUS LLP

(57) ABSTRACT

To make it possible to grasp the road surface condition more reliably when the road surface on which the irradiation pattern is formed is captured by a camera. A controller for lighting control installed in a vehicle that is equipped with a camera that captures the surroundings of the vehicle, a monitor that displays images captured by the camera, and an irradiation unit capable of irradiating light on a road surface within a range that can be captured by the camera, and in which the controller performs operation control of the irradiation unit, where the controller performs operation control of the irradiation unit so that it prevents the irradiation unit from performing light irradiation during each (Continued)

intermittently occurring capturing period of the camera, and causes the irradiation unit to irradiate light during a non-capturing period between the capturing periods.

8 Claims, 5 Drawing Sheets

(56) References Cited

U.S. PATENT DOCUMENTS

2020/0195825 A1\* 6/2020 Takemoto ............. H04N 23/74

FOREIGN PATENT DOCUMENTS

| EP | 3 093 193 A1 | 11/2016 | |
| EP | 3585047 A1 * | 12/2019 | ............. H04N 23/56 |
| EP | 3 650 271 A1 | 5/2020 | |
| JP | 2019217951 A * | 12/2019 | |
| JP | 2021-111465 A | 8/2021 | |
| WO | WO-2022080425 A1 * | 4/2022 | ........... B60Q 1/0023 |

OTHER PUBLICATIONS

Machine translation of EP-3585047-A1 (Year: 2019).*
Machine translation of WO-2022080425-A1 (Year: 2022).*
Extended European Search Report issued Dec. 6, 2023 in corresponding European Patent Application No. 23197019.5, 21 pages.

\* cited by examiner

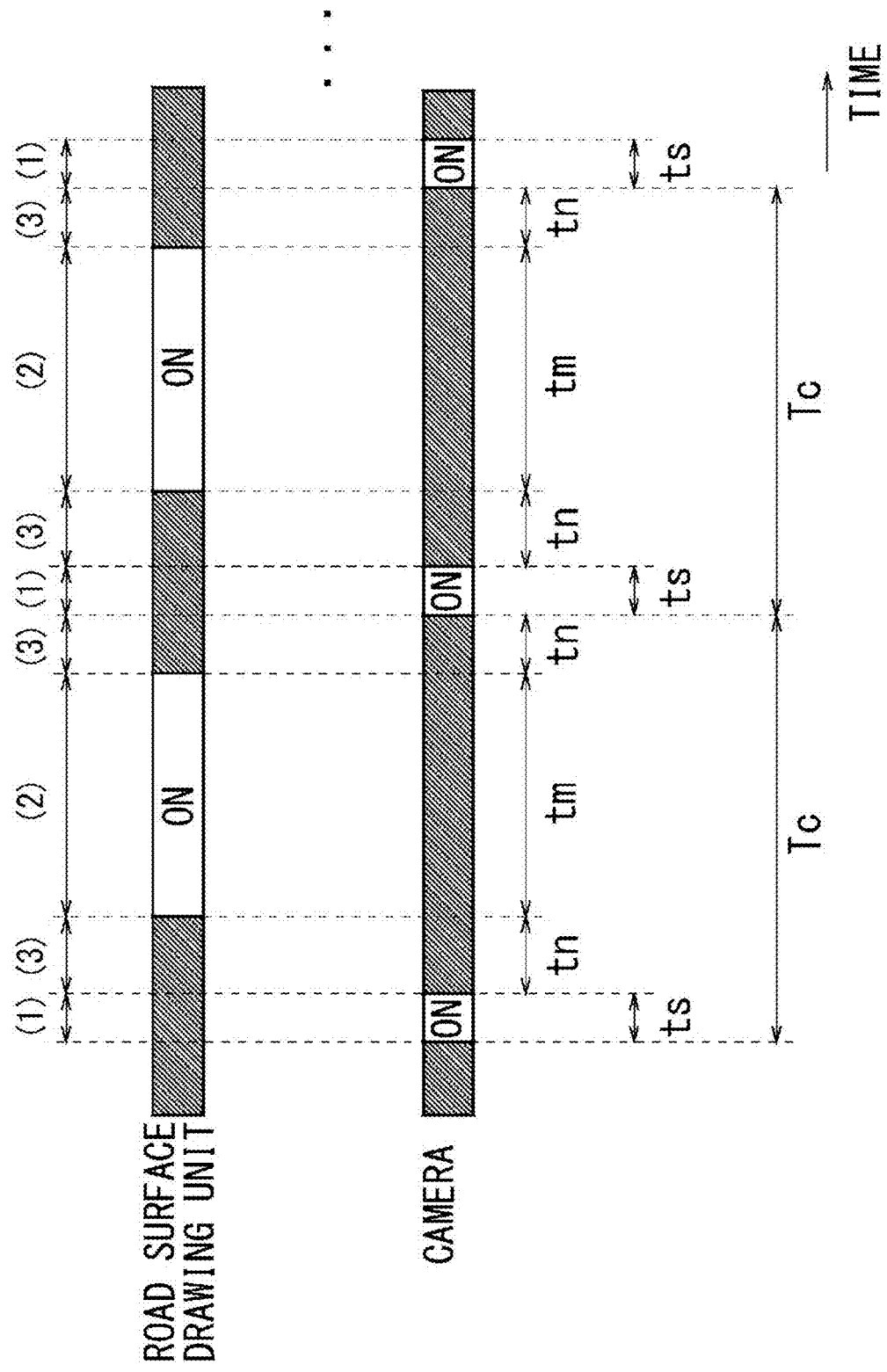

CONTROLLER FOR LIGHTING CONTROL, VEHICLE LAMP SYSTEM

CROSS-REFERENCE TO RELATED APPLICATION

This application is based upon and claims the benefit of priority from Japanese Patent Application No. 2022-147023, filed Sep. 15, 2022, the entire contents of which are incorporated herein by reference.

BACKGROUND

Technical Field

The present disclosure relates to a controller for lighting control and a vehicle lamp system.

Description of the Background Art

There is known a vehicle lamp that draws light with an irradiation pattern of a predetermined shape on a road surface around a vehicle. (For example, refer to Japanese Patent Laid-Open No. 2021-111465). Here, when the irradiation pattern as described above is drawn on the road surface and the road surface is captured by a camera and displayed on a monitor (display device), so-called white clipping (a phenomenon in which gradation is lost and becomes pure white) may occur in a portion which corresponds to the irradiation pattern in the displayed image, making it difficult to grasp road surface condition such as the presence or absence of an obstacle.

This is because the ratio of the highest brightness to the lowest brightness captured by a typical camera is about 10 times whereas the ratio of the irradiation pattern brightness on the road surface to the ambient brightness can be about 100 times, for example.

In a specific aspect, it is an object of the present disclosure to make it possible to grasp the road surface condition more reliably when the road surface on which the irradiation pattern is formed is captured by a camera.

SUMMARY (1) A controller according to one aspect of the present disclosure is (a) a controller for lighting control installed in a vehicle that is equipped with a camera that captures the surroundings of the vehicle, a monitor that displays images captured by the camera, and an irradiation unit capable of irradiating light on a road surface within a range that can be captured by the camera, and in which the controller performs operation control of the irradiation unit, where (b) the controller performs operation control of the irradiation unit so that it prevents the irradiation unit from performing light irradiation during each intermittently occurring capturing period of the camera, and causes the irradiation unit to irradiate light during a non-capturing period between the capturing periods.

(2) A vehicle lamp system according to one aspect of the present disclosure is a vehicle lamp system including: (a) a camera that captures the surroundings of a vehicle; (b) a monitor that displays images captured by the camera; (c) an irradiation unit capable of irradiating light on a road surface within a range that can be captured by the camera; and (d) a controller for lighting control that performs operation control of the irradiation unit; where (e) the controller performs operation control of the irradiation unit so that it prevents the irradiation unit from performing light irradiation during each intermittently occurring capturing period of the camera, and causes the irradiation unit to irradiate light during a non-capturing period between the capturing periods.

According to the above configurations, it is possible to grasp the road surface condition more reliably when the road surface on which the irradiation pattern is formed is captured by a camera.

BRIEF DESCRIPTION OF THE DRAWINGS

FIG. 4 is a time chart for explaining a control method performed by the controller 10.

DESCRIPTION OF THE PREFERRED EMBODIMENTS

Figure 1:
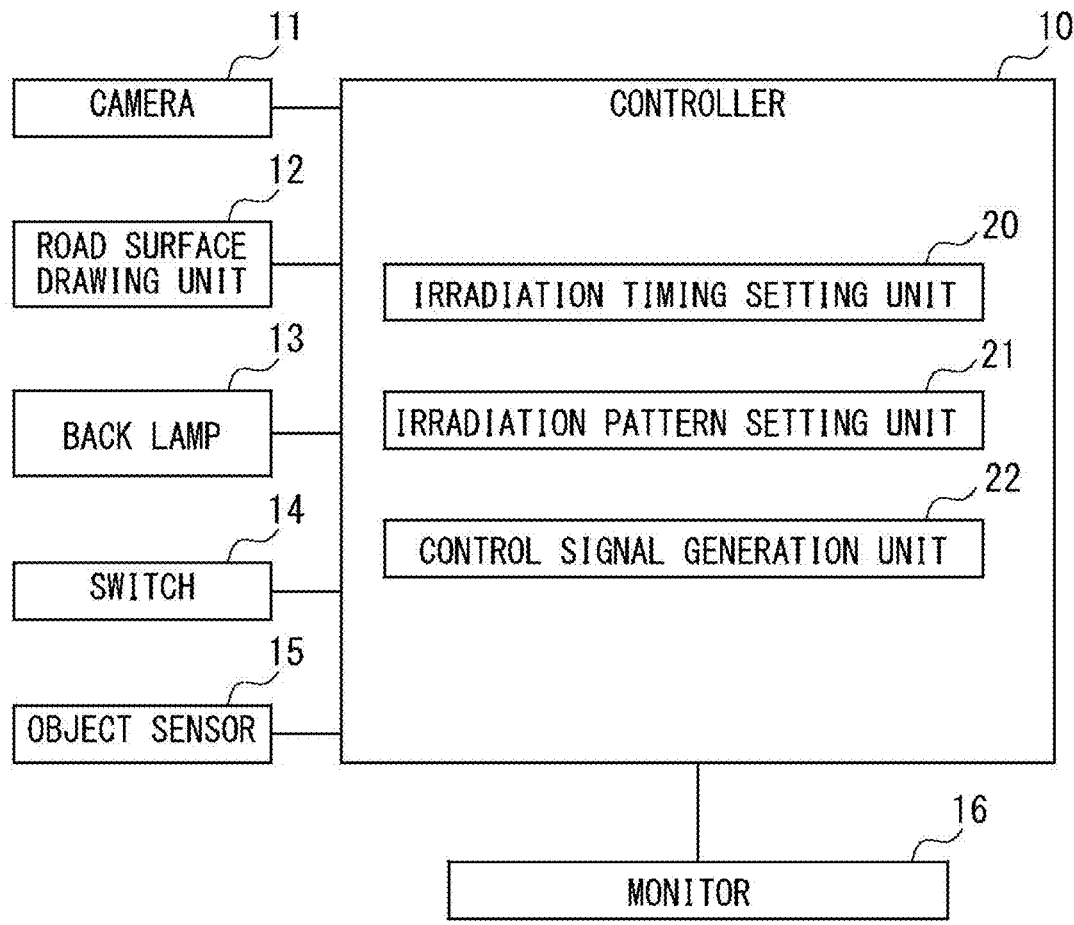
FIG. 1 is a block diagram showing the configuration of a vehicle lamp system according to one embodiment.

FIG. 1 is a block diagram showing the configuration of a vehicle lamp system according to one embodiment. The vehicle lamp system 1 of the present embodiment is configured to include a controller 10, a camera 11, a road surface drawing unit 12, a back lamp 13, a switch 14, an object sensor 15, and a monitor (display device) 16. In this embodiment, the controller 10 corresponds to a "controller for lighting control", and the method of controlling the road surface drawing unit 12 by the controller 10 corresponds to a "control method for lighting control".

The controller 10 is connected to the camera 11, the road surface drawing unit 12, the back lamp 13, the switch 14, the object sensor 15, and the monitor 16, respectively, and controls light irradiation performed by the road surface drawing unit 12 according to the capturing timing, etc. by the camera 11. For example, the controller 10 may be configured using a computer system (refer to FIG. 2 to be described later) having a processor (CPU: Central Processing Unit), a ROM (Read Only Memory), a RAM (Random Access Memory), a storage devices such as a flash memory, an input/output interface, etc. The controller 10 of the present embodiment is brought into a state capable of exhibiting a predetermined function by a processor which reads and executes a program stored in advance in the storage device (or the ROM).

The camera 11 is installed at a predetermined position at the rear of the vehicle, for example, and captures the space behind the vehicle. Captured image data (video data) obtained by the camera 11 is output to the controller 10. Further, the camera 11 outputs a signal which indicates the capturing timing to the controller 10.

The road surface drawing unit 12 is installed at a predetermined position in the rear part of the vehicle, and operates according to a control signal provided from the controller 10 to irradiate the road surface behind the vehicle with a desired irradiation pattern. The irradiation pattern formed on the road surface may be fixed or variably set. As a road surface drawing unit 12 capable of variably setting an irradiation pattern, for example, a unit that has a plurality of LEDs (Light Emitting Diodes) arranged in two directions and can individually control the lighting and extinguishing of each light emitting diode can be used.

Here, as a road surface drawing unit 12 capable of variably setting an irradiation pattern, a unit configured by combining a light source bulb, a reflecting mirror, and a shielding plate may be used, or a unit that is configured by combining a liquid crystal element capable of individually controlling the light transmission state of each pixel and a light source may be used, or a unit capable of controlling timing of turning on and off a semiconductor laser such as a laser diode and timing of scanning by a scanning element may be used. Furthermore, a unit configured by combining a plurality of lamps each capable of irradiating a different fixed light distribution may be used.

The back lamp 13 is installed at a predetermined position in the rear part of the vehicle, and operates in response to a control signal provided by the controller 10 when a vehicle shift lever is designated to "reverse", thereby irradiates the space behind the vehicle (including the road surface) at a wide angle, for example.

The switch 14 is installed at a predetermined position near the driver's seat of the vehicle, and is used to switch the display mode of the monitor 16 in which the irradiation pattern drawn by the road surface drawing unit 12 is displayed. The switch 14 may be a push button switch or a toggle switch, for example. A specific example of the display mode will be described later.

The object sensor 15 is installed at a predetermined position in the rear part of the vehicle and detects the presence of any object in the vicinity of the rear part of the vehicle (including any objects on the road surface). The "object" here includes humans and various obstacles, for example.

The monitor 16 is installed at a predetermined position near the driver's seat of the vehicle and displays images captured by the camera 11. As the monitor 16, a liquid crystal display device, an organic EL display device, or the like can be used, for example.

Functions realized by executing the program by the controller 10 described above will be explained using functional blocks. The controller 10 is configured to include an irradiation timing setting unit 20, an irradiation pattern setting unit 21, and a control signal generation unit 22.

The irradiation timing setting unit 20 sets timing of light irradiation performed by the road surface drawing unit 12. In detail, by obtaining a video signal from the camera 11 or providing a control signal to the camera 11, the irradiation timing setting unit 20 sets the timing of light irradiation so that the road surface drawing unit 12 can irradiate light at a timing that does not overlap with the capturing timing by the camera 11.

The irradiation pattern setting unit 21 variably sets the irradiation pattern according to the operation status of the switch 14 or the detection status of the object detected by the object sensor 15, for example, and outputs the setting to the control signal generation unit 22.

The control signal generation unit 22 generates a control signal for realizing an irradiation pattern set by the irradiation pattern setting unit 21 and outputs the control signal to the road surface drawing unit 12. In this embodiment, the control signal generation unit 22 generates a control signal so that the road surface drawing unit 12 performs light irradiation during a period determined according to the timing of light irradiation set by the irradiation timing setting unit 20.

Figure 2:
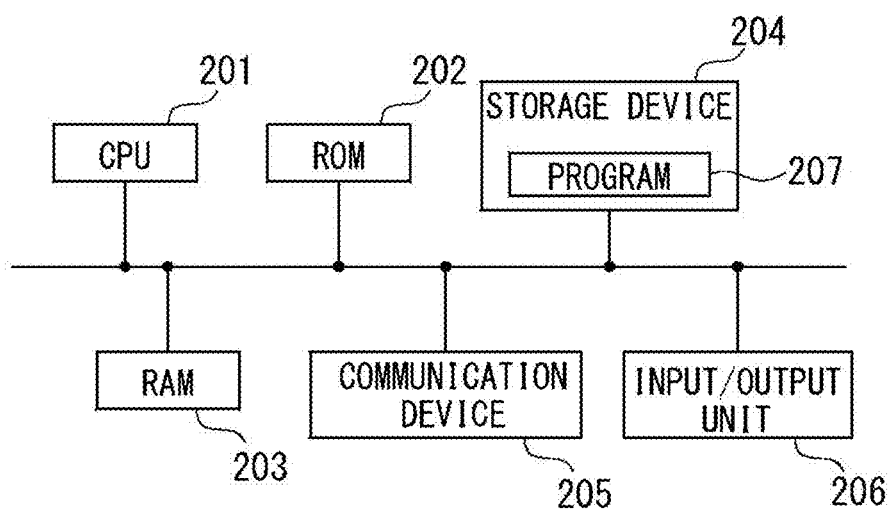
FIG. 2 is a diagram showing a configuration example of a computer system.

FIG. 2 is a diagram showing a configuration example of a computer system. The controller 10 described above can be configured using the computer system as shown in the figure, for example. A CPU (Central Processing Unit) 201 performs information processing by reading and executing a program 207 stored in a storage device 204. A ROM (Read Only Memory) 202 stores a basic control program, etc. required for the operation of the CPU 201. ARAM (a temporary memory) 203 temporarily stores data necessary for information processing by the CPU 201. The storage device 204 is a large-capacity storage device for storing data, and is composed of a hard disk drive, a solid state drive, or the like. A communication device 205 performs processing related to data communication with other external devices. An input/output unit 206 is an interface for connecting with an external device. The CPU 201, etc. are connected to one another via a bus so as to be able to communicate with one another.

Figure 3A:
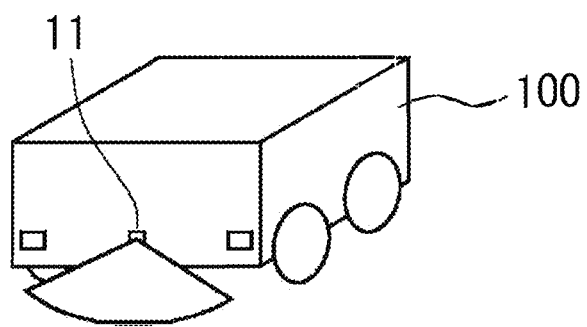
FIGS. 3A to 3C are diagrams schematically showing operating states of the camera 11 and the road surface drawing unit 12.
Figure 3B:
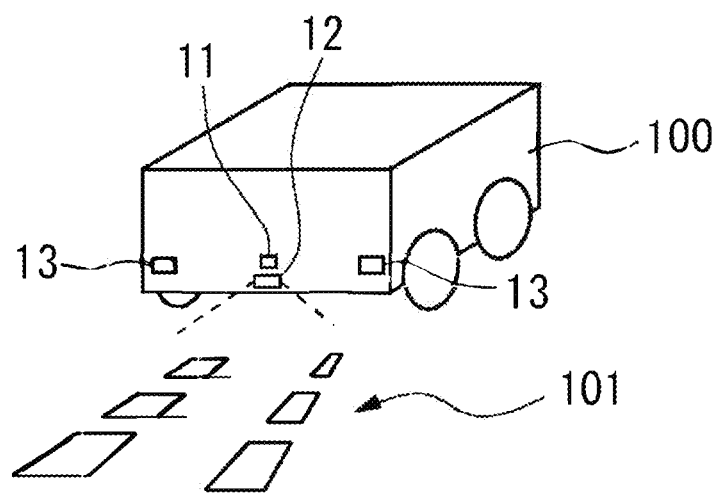
Figure 3C:
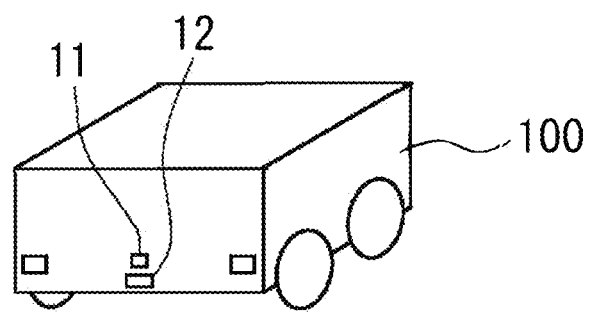

FIGS. 3A to 3C are diagrams schematically showing operating states of the camera 11 and the road surface drawing unit 12. Each figure schematically shows a camera 11, a road surface drawing unit 12, and a back lamp 13, respectively installed at the rear of the vehicle 100. In the vehicle lamp system of the present embodiment, as a basic operation, the controller 10 performs operation control of the road surface drawing unit 12 so that the capturing period by the camera 11 and the light irradiation period by the road surface drawing unit 12 are complementary.

Specifically, FIG. 3A schematically shows a state in which the camera 11 captures the space behind the vehicle 100 including the road surface, and FIG. 3B schematically shows a state in which the road surface drawing unit 12 irradiates light of a predetermined irradiation pattern 101 on the road surface. In the present embodiment, during a state in which capturing by the camera 11 is performed (refer to FIG. 3A), irradiation of the irradiation pattern 101 on the road surface by the road surface drawing unit 12 does not occur. The capturing period by the camera 11 intermittently occurs a plurality of times.

Then, during a period between one capturing period and the next capturing period in which capturing by the camera 11 is not performed (non-capturing period), irradiation of irradiation pattern 101 by the road surface drawing unit 12 is performed. (Refer to FIG. 3B.) The illustrated irradiation pattern 101 is merely an example, and a different irradiation pattern may be set depending on whether or not the object sensor detects an object. Note that the shape of the irradiation pattern 101 may be fixed.

Further, in the vehicle lamp system of the present embodiment, between the state in which capturing by the camera 11 is performed (refer to FIG. 3A) and the state in which irradiation of irradiation pattern 101 by the road surface drawing unit 12 is performed (refer to FIG. 3B), there is a state in which neither irradiation of the irradiation pattern 101 nor capturing by the camera 11 is performed. This state is schematically shown in FIG. 3C. Next, each period corresponding to each state will be described in detail using a time chart.

FIG. 4 is a time chart for explaining a control method by the controller 10. The upper part shows the operation of the road surface drawing unit 12, and the lower part shows the operation of the camera 11, each indicated by a belt-shaped time chart. Regarding the operation of the road surface drawing unit 12, "ON" indicates a period during which light is irradiated, and the other periods (hatched periods in the figure) indicate periods during which light is not irradiated. Further, regarding the operation of the camera 11, "ON" indicates a capturing period, and the other periods (hatched periods in the figure) indicate non-capturing periods.

The camera 11 is for capturing moving images, and as shown in FIG. 4, captures images at a fixed cycle Tc. This cycle Tc is determined by the standard adopted by the camera 11, and is a length corresponding to 25 fps in the case of a PAL standard composite signal, and is a length corresponding to 30 fps in the case of an NTSC standard composite signal. A capturing period ts which arrives every cycle Tc is a period required to acquire an image of one frame, and can be expressed as a shutter open period or an exposure period. It is preferable that the length of the capturing period ts is set to ½ or less of the cycle Tc. For example, in the case of an NTSC standard composite signal, it can be said that it is preferable to set to 1/60 seconds or less.

The road surface drawing unit 12 irradiates a predetermined irradiation pattern 101 (refer to FIG. 3B) under the control of the controller 10, and as shown in FIG. 4, the road surface drawing unit 12 irradiates light during a non-capturing period which does not overlap with the capturing period ts of the camera 11. It is preferable that light irradiation period tm (period indicated as "ON" in the figure) at this time is set to a longer time as long as it does not overlap with the capturing period ts. This is because the brightness of the irradiation pattern 101 can be further increased. The light irradiation period tm is set by the irradiation timing setting unit 20 of the controller 10.

Since the light irradiation period tm arrives every cycle Tc in synchronization with the capturing timing of the camera 11, for example, if cycle Tc is an NTSC standard composite signal and if the length corresponds to 30 fps (1/30 second), then the cycle at which the light irradiation period tm arrives becomes 30 Hz. At 30 Hz, human eyes can perceive the irradiation pattern 101 irradiated from the road surface drawing unit 12 (refer to FIG. 3B) as being continuously lit.

Between the light irradiation period tm and the capturing period ts, in other words, before and after the capturing period ts, there is provided a period tn during which neither the capturing by the camera 11 nor the irradiation of the irradiation pattern 101 is performed. As a result, since there is always a state in which the road surface drawing unit 12 does not irradiate on the road surface before and after the capturing by the camera 11, it is possible to more reliably prevent the camera 11 from capturing the road surface during a state in which the road surface is irradiated with irradiation pattern 101. The length of period tn is preferably as short as possible as long as the above objective can be achieved. This is to ensure a longer light irradiation period tm.

In FIG. 4, the state in which capturing is performed by the camera 11 is defined as "state 1", the state in which light irradiation is performed by the road surface drawing unit 12 is defined as "state 2", and the state in which neither capturing by the camera 11 nor light irradiation of irradiation pattern 101 is performed is defined as "state 3", which is respectively indicated as (1), (2), and (3) in FIG. 4. As shown in the figure, each state transitions in the order of state 1, state 3, state 2, state 3, state 1, state 3, . . . . In detail, state 1 is repeated at cycle Tc, and state 3 exists before and after state 1. Further, state 2 is also repeated at cycle Tc, and state 3 also exists before and after state 2. State 3 before state 1 and state 3 after state 2 are common, and state 3 after state 1 and state 3 before state 2 are common.

Here, irradiation mode of irradiation pattern 101 during light irradiation period tm may be continuous irradiation or pulse irradiation. In the case of pulse irradiation, for example, pulse irradiation at a frequency of about 200 Hz to 500 Hz is preferable. By applying pulse irradiation, an increase or decrease in the illuminance of the irradiation pattern 101 can be controlled by the pulse width.

Figure 5:
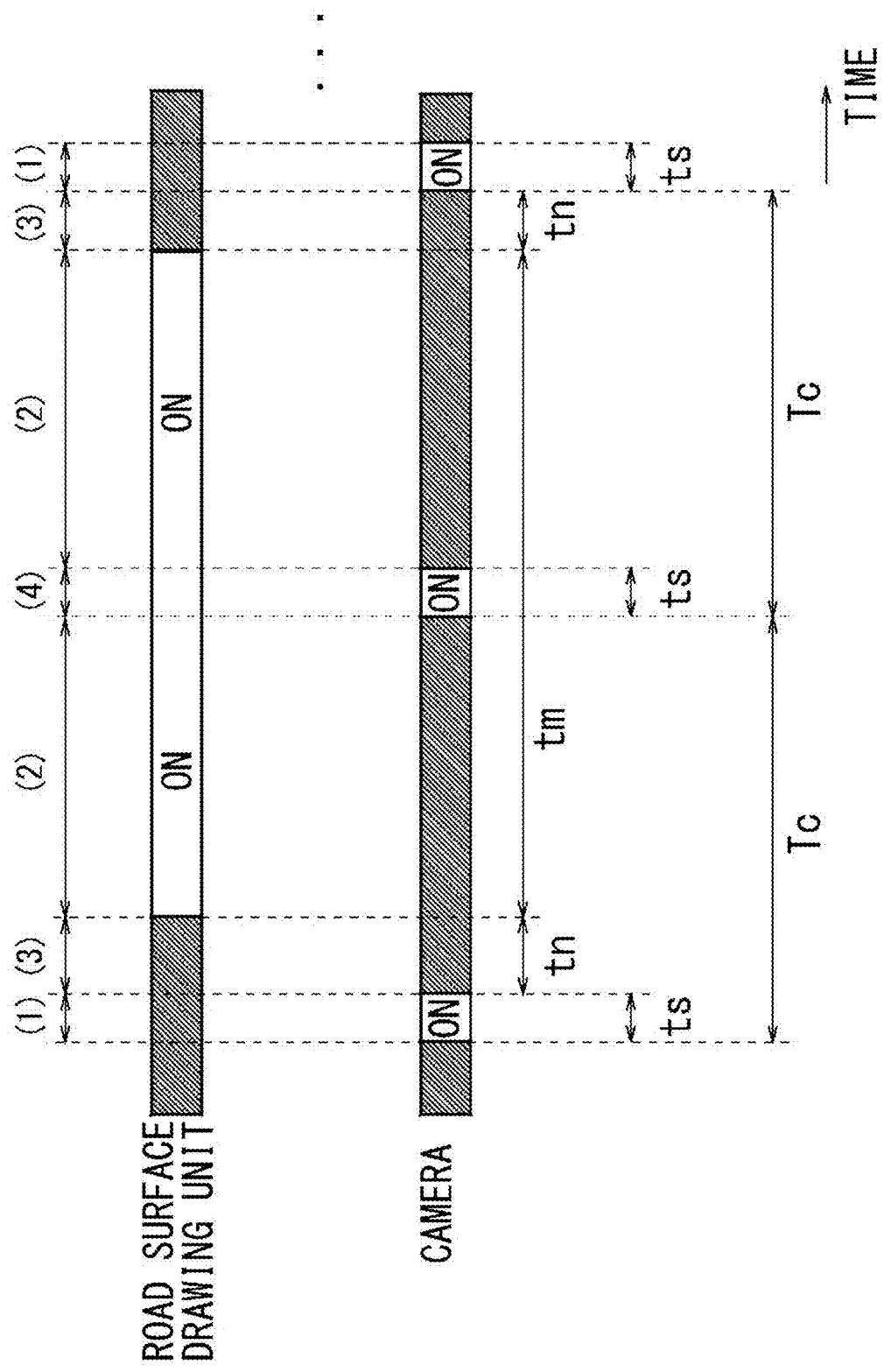
FIG. 5 is a time chart for explaining a modified example of a control method performed by the controller 10.

FIG. 5 is a time chart for explaining a modified example of a control method by the controller 10. The basic control method of this example is as described above with reference to FIG. 4, therefore, only the differences will be described in detail. In the control method of this modified example, basically as described above, the road surface drawing unit 12 is controlled by the controller 10 so that transitions are made in the order of state 1, state 3, state 2, state 3, state 1, state 3, . . . .

Furthermore, in this modified example, the road surface drawing unit 12 is controlled so that capturing period ts and light irradiation period tm by the road surface drawing unit 12 overlap once every multiple times (for example, five times) of the capturing period ts by the camera 11. Such a state in which both the irradiation of irradiation pattern 101 and capturing by the camera 11 are performed is defined as "state 4" and is indicated by (4) in the figure. By causing this state 4 to occur once every multiple times of capturing period ts, the camera 11 can intermittently capture the irradiation pattern 101 (refer to FIG. 3B) on the road surface. As a result, the monitor 16 intermittently displays the predetermined irradiation pattern 101 formed by the road surface drawing unit 12. Depending on the occurrence cycle of state 4, the human eye perceives the irradiation pattern 101 displayed on the monitor 16 as a blinking display.

Whether or not to display such irradiation pattern 101 can be selected using the switch 14 described above, for example. That is, by setting the timing of light irradiation of the road surface drawing unit 12 by the irradiation timing setting unit according to the state of the switch 14, state 4 can be generated between state 2 and the following state 2. Here, state 4 may be generated when an object is detected by the object sensor 15. As a result, the presence of an object can be notified to the driver through the blinking display.

Further, brightness of irradiation pattern 101 during the period in which state 4 is generated may be reduced to about 1/10, for example. As a result, white clipping can be suppressed. Dimming of the irradiation pattern 101 can be achieved by reducing the pulse width of the ON period if control method of the road surface drawing unit 12 is pulse width control, or can be achieved by lowering the current value if control method of the unit is current control.

According to the above-described embodiments, when a road surface on which an irradiation pattern is formed is captured by a camera, it is possible to avoid so-called white clipping and to grasp the road surface condition more reliably. Further, in the aspect of intermittently generating a state in which both the irradiation of irradiation pattern 101 and capturing by the camera 11 are performed (state 4), it is possible to achieve both grasping the road surface condition and visual recognition of irradiation pattern 101 drawn on the road surface.

Figure 6:
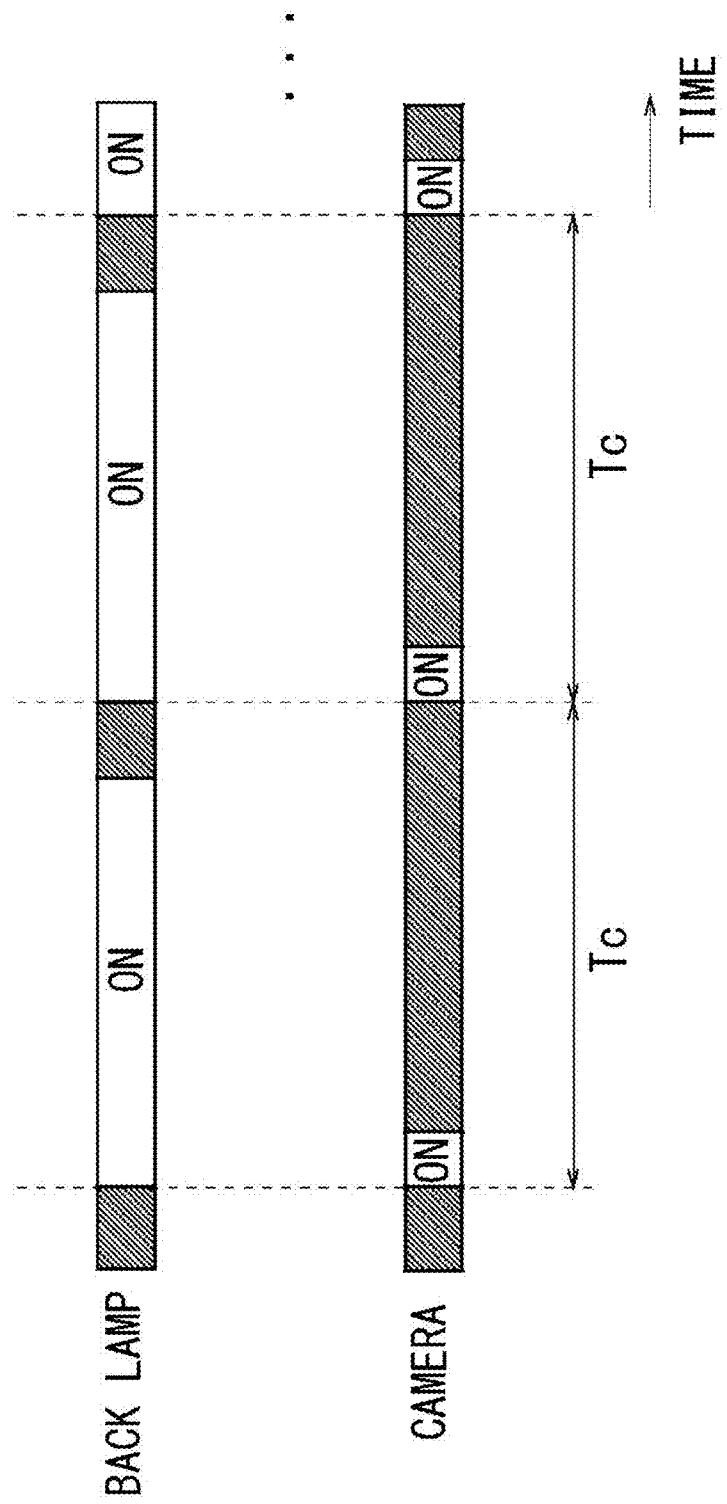
FIG. 6 is a time chart for explaining a modified example of a control method performed by the controller 10.

Here, it should be noted that the present disclosure is not limited to the content of the above-described embodiments, and can be implemented in various modifications within the scope of the gist of the present disclosure. For example, the timing of light irradiation of the back lamp 13 in the above-described embodiment may be synchronized with the capturing period of the camera 11. Specifically, as shown in FIG. 6, when capturing period ts of the camera 11 arrives at cycle Tc, the back lamp 13 can also be pulse-controlled so as to irradiate light in synchronization with the cycle Tc. As a result, since light irradiation by the back lamp 13 is performed in correspondence with the capturing period is of the camera 11, the image captured by the camera 11 and displayed on the monitor 16 can be made brighter.

Further, in the above-described embodiments, a case where the camera 11 and the road surface drawing unit 12 are installed in the rear part of the vehicle has been exemplified, but the installation position is not limited thereto, and an arbitrary installation position such as a vehicle front portion or a vehicle side portion can be selected. For example, the camera 11 may capture the space in front of the vehicle, and the road surface drawing unit 12 may perform light irradiation on the road surface in front of the vehicle. In this case, the back lamp 13 in the above-described embodiment is replaced with a headlamp, a cornering lamp, or the like that irradiates light forward of the vehicle. The cornering lamp referred to here is a lamp that irradiates light obliquely forward of the vehicle in accordance with the traveling direction of the vehicle. This makes it possible to more reliably grasp the road surface condition in front of the vehicle. Further, in the mode in which state 4 is intermittently generated as described above, it is possible to achieve both grasping the road surface condition in front of the vehicle and visual recognition of irradiation pattern 101 drawn on the road surface.

The present disclosure has features as appended below.

(Appendix 1)

A controller for lighting control installed in a vehicle that is equipped with a camera that captures the surroundings of the vehicle, a monitor that displays images captured by the camera, and an irradiation unit capable of irradiating light on a road surface within a range that can be captured by the camera, and in which the controller performs operation control of the irradiation unit, wherein the controller performs operation control of the irradiation unit so that it prevents the irradiation unit from performing light irradiation during each intermittently occurring capturing period of the camera, and causes the irradiation unit to irradiate light during a non-capturing period between the capturing periods.

(Appendix 2)

The controller according to appendix 1,
wherein the controller performs operation control of the irradiation unit so that, within the non-capturing period, the irradiation unit irradiates light in a shorter time than the non-capturing period.

(Appendix 3)

The controller according to appendix 1 or appendix 2,
wherein the controller performs operation control of the irradiation unit so that, before and after the capturing period, a period is provided where neither light irradiation by the irradiation unit nor capturing by the camera is performed.

(Appendix 4)

The controller according to any one of Appendices 1 to 3,
wherein the controller causes the light irradiation unit to perform light irradiation within the capturing period at a rate of once for the plurality of capturing periods.

(Appendix 5)

The controller according to appendix 4,
wherein the controller is able to switch with an external switch whether or not to execute light irradiation by the light irradiation unit at a rate of once for the plurality of capturing periods.

(Appendix 6)

The controller according to appendix 4,
wherein the vehicle is further equipped with an object sensor, and
wherein the controller causes the light irradiation unit to perform light irradiation at a rate of once for the plurality of capturing periods when the presence of an object is detected by the object sensor.

(Appendix 7)

The controller according to any one of Appendices 1 to 6,
wherein the vehicle is further equipped with a lamp capable of irradiating space within a range that can be captured by the camera, and
wherein the controller performs operation control of the lamp so that the light irradiation period by the lamp is synchronized with the capturing period of the camera.

(Appendix 8)

The controller according to appendix 7,
wherein the lamp is either a back lamp, a head lamp, or a cornering lamp.

(Appendix 9)

The controller according to appendix 7,
wherein the lamp has a light source using a light emitting diode or a semiconductor laser.

(Appendix 10)

A vehicle lamp system comprising:
a camera that captures the surroundings of the vehicle;
a monitor that displays the image captured by the camera;
an irradiation unit capable of irradiating light on a road surface within a range that can be captured by the camera; and
a controller for lighting control that performs operation control of the irradiation unit;
wherein the controller performs operation control of the irradiation unit so that it prevents the irradiation unit from performing light irradiation during each intermittently occurring capturing period of the camera, and causes the irradiation unit to irradiate light during a non-capturing period between the capturing periods.

DESCRIPTION OF SYMBOLS

10:Controller,
11:Camera
12:Road surface drawing unit
13:Back lamp
14:Switch
15:Object sensor
16:Monitor
20:Irradiation timing setting unit,
21:Irradiation pattern setting unit
22:Control signal generation unit
100:Vehicle
101:Irradiation pattern

What is claimed is:

1. A controller for lighting control installed in a vehicle, comprising:
processing circuitry configured to
control a light source to stop performing light irradiation during each intermittently occurring capturing period of a camera,
cause the light source to irradiate light during a non-capturing period between the capturing periods, and
selectively cause the light source to perform light irradiation at a rate of once per plurality of capturing periods when the presence of an object is detected by an object sensor installed in the vehicle.

2. The controller according to claim 1, wherein the processing circuitry is further configured to
   control the light source so that, within the non-capturing period, the light source irradiates light in a shorter time than the non-capturing period.

3. The controller according to claim 1, wherein the processing circuitry is further configured to
   control the light source so that, before and after the capturing period, a period is provided where neither light irradiation by the light source nor capturing by the camera is performed.

4. The controller according to claim 1, wherein the processing circuitry is further configured to
   switch with an external switch whether or not to execute light irradiation by the at a rate of once for the plurality of capturing periods.

5. The controller according to claim 1, wherein the processing circuitry is further configured to
   control a lamp installed in the vehicle, the lamp being capable of irradiating space within a range than can be captured by the camera, so that the light irradiation period by the lamp is synchronized with the capturing period of the camera.

6. The controller according to claim 5,
   wherein the lamp is either a back lamp, a head lamp, or a cornering lamp.

7. The controller according to claim 5,
   wherein the lamp includes a light emitting diode or a semiconductor laser.

8. A vehicle lamp system comprising:
   a camera that captures the surroundings of the vehicle;
   a monitor that displays images captured by the camera;
   an object sensor;
   a light source capable of irradiating light on a road surface within a range that can be captured by the camera; and
   processing circuitry configured to
      control the light source to stop performing light irradiation during each intermittently occurring capturing period of the camera,
      cause the light source to irradiate light during a non-capturing period between the capturing periods, and
      selectively cause the light source to perform light irradiation at a rate of once per plurality of capturing periods when the presence of an object is detected by the object sensor.

* * * * *